(12) United States Patent
Hirayama et al.

(10) Patent No.: US 8,659,669 B2
(45) Date of Patent: Feb. 25, 2014

(54) IMAGE STABILIZATION CIRCUIT WITH HIGH PASS FILTER

(75) Inventors: Hideki Hirayama, Gifu (JP); Naoto Iwata, Nagoya (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 329 days.

(21) Appl. No.: 12/764,412

(22) Filed: Apr. 21, 2010

(65) Prior Publication Data
US 2010/0265341 A1    Oct. 21, 2010

(51) Int. Cl.
*H04N 5/228*      (2006.01)

(52) U.S. Cl.
USPC ............................ 348/208.1; 396/52; 396/55

(58) Field of Classification Search
USPC ........ 348/208.1, 208.2, 208.5, 208.6; 396/52, 396/55
See application file for complete search history.

(56) References Cited

U.S. PATENT DOCUMENTS

| 4,070,550 | A  | * | 1/1978  | Miller et al. ................ 370/204 |
| 5,608,703 | A  | * | 3/1997  | Washisu ..................... 348/208.7 |
| 5,805,212 | A  | * | 9/1998  | Fujiwara .................... 348/208.8 |
| 6,801,247 | B1 | * | 10/2004 | Ohishi et al. ............... 348/208.1 |
| 7,688,447 | B2 | * | 3/2010  | Shakespeare et al. ....... 356/402 |
| 2004/0189815 | A1 | * | 9/2004 | Kumaki ................... 348/208.99 |
| 2004/0218056 | A1 | * | 11/2004 | Nomura et al. ............. 348/208.6 |
| 2005/0206738 | A1 | * | 9/2005 | Kumaki et al. .......... 348/208.99 |
| 2006/0104620 | A1 | * | 5/2006 | Ebato ............................. 396/55 |
| 2007/0166021 | A1 | * | 7/2007 | Yamazaki ..................... 396/55 |
| 2009/0160948 | A1 | * | 6/2009 | Tabuchi ................... 348/208.2 |
| 2009/0167879 | A1 | * | 7/2009 | Ohno ..................... 348/208.12 |
| 2009/0231444 | A1 | * | 9/2009 | Shibata ................... 348/208.1 |
| 2010/0026880 | A1 | * | 2/2010 | Ito et al. ....................... 348/352 |
| 2010/0033583 | A1 | * | 2/2010 | Tomita et al. ............. 348/208.5 |
| 2010/0085436 | A1 |   | 4/2010 | Ohno |
| 2010/0124411 | A1 | * | 5/2010 | Hirayama ..................... 396/55 |

FOREIGN PATENT DOCUMENTS

| JP | H0421831 A    | 1/1992 |
| JP | 10-213832 A   | 8/1998 |
| JP | 2001209084 A  | 8/2001 |
| WO | 2008117584 A1 | 10/2008 |

OTHER PUBLICATIONS

Notice of Grounds for Rejection for Japanese Patent Application No. 2009-102620; Date of Mailing: Jun. 25, 2013, with English Translation.

* cited by examiner

*Primary Examiner* — Nicholas Giles
*Assistant Examiner* — Abdelaaziz Tissire

(57) ABSTRACT

A first high-pass filter comprising a low-pass filter which allows only a frequency component of an input signal less than or equal to a first frequency to pass, a latch unit which latches an output of a low-pass filter according to a control signal, and a calculating unit which outputs a difference between an input signal and an output of the latch unit are provided on an image stabilization circuit. When latching in the latch unit is released, a held value of the latch unit is stepwise changed to the output value of the low-pass filter. Such a first high-pass filter is used in a centering process of an optical element.

7 Claims, 5 Drawing Sheets

IMAGE STABILIZATION CIRCUIT WITH HIGH PASS FILTER

CROSS-REFERENCE TO RELATED APPLICATIONS

The entire disclosure of Japanese Patent Application No. 2009-102620 filed on Apr. 21, 2009, including specification, claims, drawings, and abstract, is incorporated herein by reference in its entirety.

BACKGROUND

1. Technical Field

The present invention relates to an image stabilization circuit used in an image capturing device or the like.

2. Related Art

In recent years, image capturing devices such as a digital still camera and a digital video camera realize higher image quality by increasing the number of pixels of an image capturing element of the image capturing device. On the other hand, as another method for realizing higher image quality of the image capturing device, it is desired to equip the image capturing device with an image stabilization circuit having a shake correction function in order to prevent shaking of an imaging target caused by shaking of the hand holding the image capturing device.

More specifically, the image capturing device comprises a detecting element such as a gyro sensor, and an optical component such as a lens and an image capturing element according to an angular velocity component caused by vibration of the image capturing device, to prevent shaking of the imaging target. With this structure, even when the image capturing device is vibrated, the component of the vibration is not reflected in the acquired image signal, and a high quality image signal without image shake can be acquired.

FIG. 5 is a functional block diagram of an image stabilization circuit. An image stabilization circuit 100 comprises an analog-to-digital converter circuit (ADC) 10, an adder circuit 12, a servo circuit 14, a high-pass filter (HPF) 16, an integrator circuit 22, a centering processor circuit 24, and a digital-to-analog converter circuit (DAC) 26.

The image stabilization circuit 100 is connected to a position detecting element 102, a lens driving element 104, and a vibration detecting element 106. The position detecting element 102 is provided on at least two or more axes so that the position of a lens driven by the lens driving element 104 can be measured in such a manner as to at least allow orthogonal conversion. Similarly, the vibration detecting element 106 is provided on at least two or more axes so that the components of the vibration can be orthogonally converted along two axes including a yaw direction and a pitch direction. Output signals of the position detecting element 102 and the vibration detecting element 106 are subjected to an addition process or the like between X-axis components and between Y-axis components, and the lens position is controlled in the yaw direction (X-axis direction) and the pitch direction (Y-axis direction) based on the processed output signals.

The ADC 10 converts an analog voltage signal which is output from the position detecting element 102, for example, a Hall element, into a digital signal. The Hall element generates an induced current corresponding to a magnetic force from a magnet which is fixed on the lens, and outputs a voltage signal indicating the position of the lens according to the induced current. The ADC 10 converts the voltage signal into a digital signal, and outputs the converted signal as a position signal (Hall-X, Hall-Y). The ADC 10 is configured such that the ADC 10 outputs a signal which indicates a reference, for example, a digital value of "0", when the optical axis of the lens and the center of the image capturing element provided in the image capturing device match each other. The ADC 10 also converts an analog angular velocity signal (Gyro-X, Gyro-Y) which is output from the vibration detecting element 106, for example, a gyro sensor, into a digital signal. More specifically, the ADC 10 digitizes the output signals from the position detecting element 102 and the vibration detecting element 106 in a time divisional manner and outputs the resulting signals. The ADC 10 outputs the signals (Gyro-X, Gyro-Y) to the HPF 16 and the signals (Hall-X, Hall-Y) to the adder circuit 12.

The HPF 16 removes a direct current component included in the angular velocity signal which is output from the vibration detecting element 106, and extracts a high-frequency component of the angular velocity signal reflecting the vibration of the image capturing device. The integrator circuit 22 integrates the angular velocity signal which is output by the HPF 16, and generates an angle signal which indicates an amount of movement of the image capturing device. The integrator circuit 22 preferably comprises a digital filter (not shown), and determines the angle signal, that is, the amount of movement of the image capturing device, by applying a filtering process according to a filter coefficient which is set in a register (not shown).

As shown in FIG. 6, the centering processor circuit 24 comprises a high-pass filter (HPF) comprising a low-pass filter (LPF) 24a which allows only a frequency band of the input signal which is less than or equal to a predetermined frequency to pass, a latch circuit 24b which latches an output value of the LPF 24a according to a latch control signal and outputs the latched value, and an adder 24c which outputs a difference between an input signal and the output value of the latch circuit 24b. When a shake correction process is executed in the image capturing device, there may be cases where, as the correction process continues to be executed, the position of the lens is gradually deviated from the reference position and reaches a point near a limit point of the movable range of the lens. If the shake correction process is continued, the lens can move in one direction, but cannot move in the other direction. The centering processor circuit 24 is provided in order to prevent this phenomenon, and controls the lens so that the position of the lens does not tend to reach the limit point of the movable range, by subtracting a predetermined value from the angle signal.

The adder circuit 12 adds the position signal (Hall-X) which is output from the ADC 10 and an X-axis component of a vibration component signal (SV-X) generated by the centering processor circuit 24, adds the position signal (Hall-Y) which is output from the ADC 10 and a Y-axis component of the vibration component signal (SV-Y) generated by the centering processor circuit 24, and outputs the results to the servo circuit 14. The servo circuit 14 generates a correction signal SR for controlling the driving of the lens driving element 104 according to the output signals from the adder circuit 12. The servo circuit 14 comprises a register and a digital filter circuit, and applies a filter process using a filter coefficient stored in the register. The DAC 26 converts a digital correction signal SR into an analog signal. The lens of the image capturing device is driven in each of the X-axis direction and the Y-axis direction by the lens driving element 104 based on the correction signal SR which is converted into an analog signal by the DAC 26.

SUMMARY

When an image capturing device is set to fit the imaging target in an image capturing range or when a video image of the imaging target is to be captured, a process to constantly move the lens to the center along with the shake correction process is required in order to ensure that the correction range is not exceeded by a significant vibration or the like of the image capturing device. With this process, when a still image is captured by pressing a shutter at a time when the imaging target is fitted within the image capturing range, the correction range by the shake correction can be substantially maintained.

In addition, when the centering process is executed during the image capturing of the still image, the capability of the shake correction would be reduced, and thus the centering process must be stopped.

In consideration of the above, the latch circuit 24b is provided in the centering processor circuit 24. FIG. 7 shows a change with respect to time of an input signal Sin to the centering processor circuit 24, an output value SLPF of the LPF 24a, an output value Z3 of the latch circuit 24b, an output signal Sout of the centering processor circuit 24, and a shutter signal SHOT. Before the capturing of the still image (before input of shutter), the centering process is executed by continuously updating the latch circuit 24b with the output value of the LPF 24a. When the still image is captured, the output value of the LPF 24a is latched in the latch circuit 24b according to the switching ON of the shutter input, and the output value is held until the capturing of the still image is completed.

However, even during the image capturing period of the still image, the LPF 24a continues to operate. If the latch of the latch circuit 24b is released at the time when the shutter input is switched OFF, a significant difference would be caused between the output value SLPF of the LPF 24a at that point and the value Z3 latched in the latch circuit 24b at that point, and the output value Sout of the centering processor circuit 24 may suddenly vary significantly (portion shown in FIG. 7 with an arrow).

With this process, when the capturing of the still image is completed, the lens would be significantly moved, and skipping of an image may be caused in the finder or the liquid crystal monitor, a source of noise from the image capturing device may be created, or an uncomfortable feeling may be caused for the person performing the imaging with the transfer of the movement of the lens to the hand of the person.

According to one aspect of the present invention, there is provided an image stabilization circuit comprising a first high-pass filter which receives an input signal and which allows a frequency band of greater than or equal to a predetermined frequency to pass, wherein the first high-pass filter comprises a first low-pass filter which allows a frequency component of the input signal less than or equal to a first frequency to pass, a latch unit which latches an output of the first low-pass filter according to a control signal, and a calculating unit which outputs a difference between the input signal and an output of the latch unit, and a held value of the latch unit is stepwise changed to the output value of the first low-pass filter when latch by the latch unit is released.

BRIEF DESCRIPTION OF THE DRAWINGS

Preferred embodiments of the present invention will be described in further detail based on the following drawings, wherein.

DETAILED DESCRIPTION

First Preferred Embodiment

Figure 1:
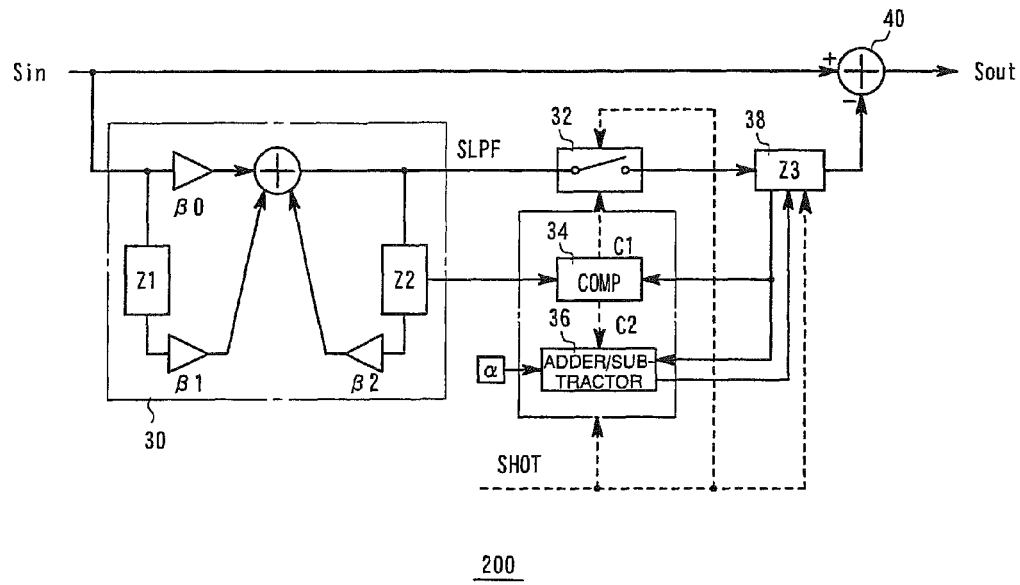
FIG. 1 is a diagram showing a structure of a centering processor circuit according to a first preferred embodiment of the present invention.

As shown in FIG. 1, a centering processor circuit 200 according to a first preferred embodiment of the present invention comprises a low-pass filter (LPF) 30, a switch element 32, a comparator 34, an adder/subtractor 36, a latch element 38, and an adder 40.

Figure 5:
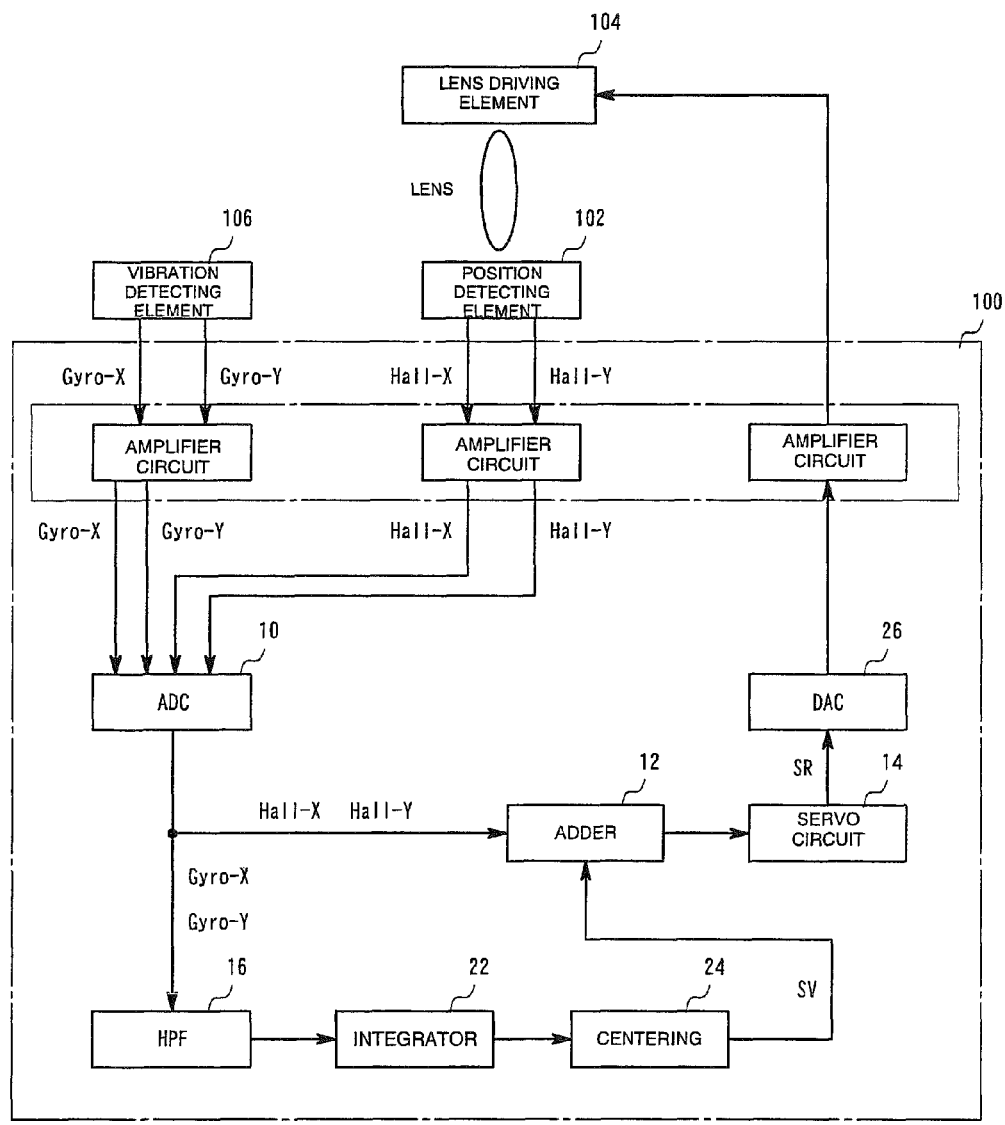
FIG. 5 is a diagram showing a structure of an image stabilization circuit.
Figure 6:
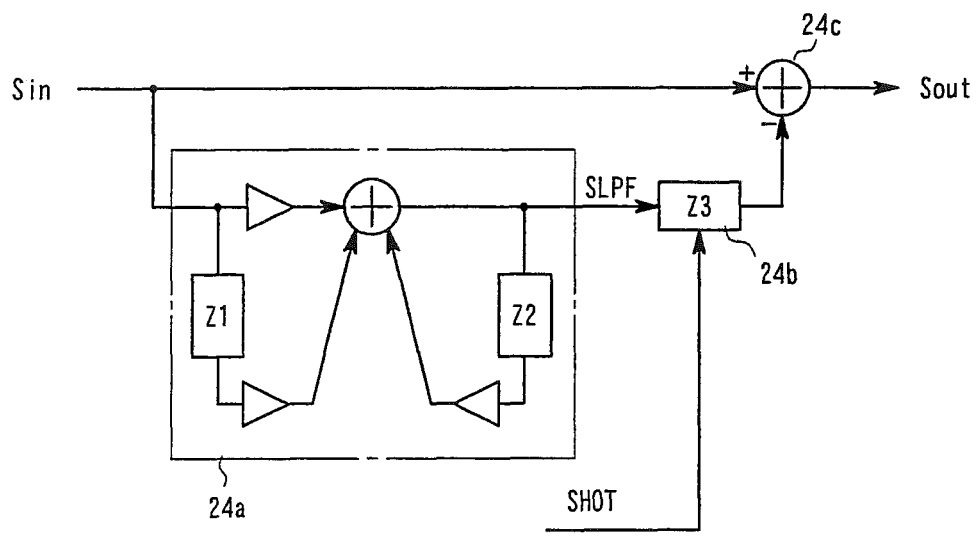
FIG. 6 is a diagram showing a structure of a centering processor circuit of related art.
Figure 7:
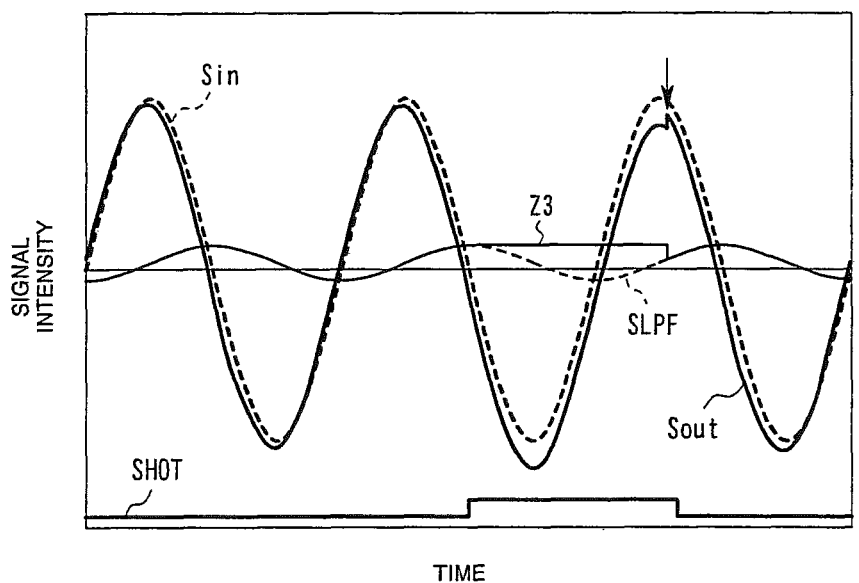
FIG. 7 is a diagram showing an operation of the centering processor circuit of related art.

The centering processor circuit 200 according to the present embodiment is used in place of the centering processor circuit 24 of the image stabilization circuit 100 shown in FIG. 5, and receives a signal from the integrator circuit 22 as an input signal and outputs a signal to the adder circuit 12. As there is no difference in the constituent elements from the image stabilization circuit 100 other than the centering processor circuit 200, in the following description, the centering processor circuit 200 will be described in detail.

The centering processor circuit 200 functions as a high-pass filter which receives an input signal which is converted from an angular velocity to an angle (amount of movement of the image capturing device) at the integrator circuit 22, and which allows passage of and outputs only frequency components of the angle signal greater than or equal to a predetermined cutoff frequency $f_c$.

The LPF 30 receives an input signal which is converted from the angular velocity to the angle (amount of movement of the image capturing device) in the integrator circuit 22, and allows passage of and outputs only components of the angle signal less than or equal to the cutoff frequency $f_c$. The LPF 30 may be constructed, for example, with a digital filter, an RC circuit, an RL circuit, an RLC circuit, etc. In FIG. 1, the LPF 30 is constructed with a first-order IIR filter, and the frequency characteristic of the LPF 30 can be adjusted by changing coefficients $\beta 0$, $\beta 1$, and $\beta 2$ with respect to the input signal, a register Z1, and a register Z2.

The switch element 32 receives a shutter signal SHOT and a control signal C1 from the comparator 34, and connects/disconnects the output of the LPF 30 and the input of the latch element 38 according to the shutter signal SHOT and the control signal C1. More specifically, the switch element 32 is opened and the output of the LPF 30 and the input of the latch element 38 are disconnected from each other in synchronization with the time when the shutter of the image capturing device is pressed and the shutter signal SHOT is switched ON (high level). Similarly, the switch element 32 is closed and the output of the LPF 30 and the input of the latch element 38 are connected to each other in synchronization with the time when the control signal C1 is switched ON (low level). The control signal C1 will be described in detail later.

The comparator 34 compares the value Z2 of the register included in the LPF 30 and the value Z3 of the latch element 38, and outputs the control signal C1 and a control signal C2 corresponding to the comparison result to the switch element 32 and the adder/subtractor 36.

The control signal C1 is generated as a signal indicating that the relationship in size between the values Z2 and Z3 is reversed. For example, the comparator 34 changes the control signal C1 from the OFF state (low level) to the ON state (high level) at a time of transition from a state where the value Z2 is greater than the value Z3 to a state where the value Z2 is less than the value Z3 or at a time of transition from a state where the value Z3 is greater than the value Z2 to a state where the value Z3 is less than the value Z2.

The control signal C2 is generated as a signal according to the relationship in size of the value Z2 and the value Z3. The comparator 34 sets the control signal C2 as an addition instructing signal when the value Z2 is greater than the value Z3, and sets the control signal C2 as a subtraction instructing signal when the value Z2 is less than the value Z3. When the value Z2 and the value Z3 are equal to each other, the control signal C2 may be set to either of the addition instructing signal or the subtraction instructing signal, but in the present embodiment, the control signal is set as the addition instructing signal in such a case.

The adder/subtractor 36 executes addition or subtraction between the value Z3 of the latch element 38 and a predetermined value α according to the control signal C2 from the comparator 34, and outputs the calculation result to the latch element 38. The adder/subtractor 36 adds the predetermined value α to the current value Z3 of the latch element 38 and outputs the resulting value to the latch element 38 when the control signal C2 is the addition instructing signal. Similarly, the adder/subtractor 36 subtracts the predetermined value α from the current value Z3 of the latch element 38 and outputs the resulting value to the latch element 38 when the control signal C2 is the subtraction instructing signal.

The predetermined value α is preferably set to a value so that the value of the latch element 38 is stepwise changed, and not rapidly changed after the completion of an image capturing period of a still image. For example, the predetermined value α is preferably set according to an average change width of the output value of the LPF 30 in the image capturing device on which the image stabilization circuit 100 is equipped. More specifically, the predetermined value α is preferably set to a value of approximately ½~1/10 of the average change width of the output value of the LPF 30. Alternatively, for example, it is also preferable to set the predetermined value α based on a difference between the value Z2 and the value Z3 at the time when the shutter signal SHOT changes from the ON state to the OFF state. More specifically, the predetermined value α is preferably set to a value of approximately ½~1/10 of the difference between the values Z2 and Z3.

The comparator 34 and the adder/subtractor 36 are preferably operated in synchronization with the time when the shutter signal SHOT is changed from the ON state to the OFF state. In addition, the operations of the comparator 34 and adder/subtractor 36 are preferably stopped in synchronization with a time when the control signal C1 is set to the ON state at the comparator 34.

The latch element 38 is switched according to the shutter signal SHOT between a state where the value is updated by an input signal and is output as the value Z3, and a state where the input signal is latched and is output as the value Z3. When the shutter signal SHOT is in the OFF state, the latch element 38 updates the value Z3 by the output value of the LPF 30 which is input through the switch element 32 when the switch element 32 is closed, updates the value Z3 by the output value from the adder/subtractor 36 when the switch element 32 is open, and outputs the updated value Z3 to the adder 40. When, on the other hand, the shutter signal SHOT is in the ON state, the latch element 38 latches the value Z3 at the time when the switch element 32 is opened, and outputs the latched value Z3 to the adder 40.

The adder 40 subtracts the value Z3 which is input from the latch element 38, from the angle signal which is input from the integrator circuit 22, and outputs the subtracted result.

Figure 2:
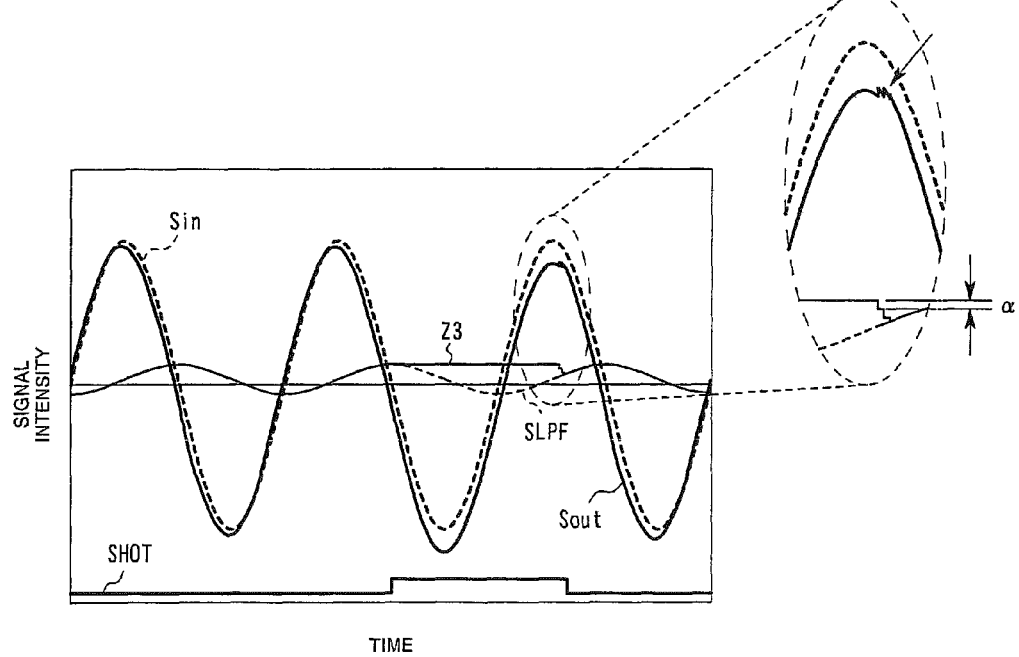
FIG. 2 is a diagram showing an operation of the centering processor circuit according to the first preferred embodiment of the present invention.

Next, an operation of the centering processor circuit 200 will be described with reference to FIG. 2. FIG. 2 shows a change with respect to time of the input signal Sin to the centering processor circuit 200, the output value SLPF of the LPF 30, the output value Z3 of the latch element 38, the output signal Sout of the centering processor circuit 200, and the shutter signal SHOT. In addition, FIG. 2 also shows a partial enlarged view for clearly showing the operation of the centering processor circuit 200 according to the present embodiment.

When the image capturing device is set to fit the imaging target within an image capturing range or when a video image of the imaging target is to be captured, the shutter of the image capturing device is not pressed. In this case, the shutter signal SHOT is in the OFF state. When the shutter signal SHOT is in the OFF state and the switch element 32 is closed, the LPF 30 receives the angle signal from the integrator circuit 22, allows only the signal in the angle signal having a frequency less than or equal to the cutoff frequency $f_c$ to pass, and outputs the signal. The latch element 38 is updated by the output value from the LPF 30 and outputs the value Z3 to the adder 40. The adder 40 applies a process to subtract the value Z3 which is output from the latch element 38 from the angle signal from the integrator circuit 22. With this process, in the centering processor circuit 200 as a whole, a signal in which the frequency components of the angle signal having a frequency less than or equal to the cutoff frequency $f_c$ are removed from the angle signal, that is, frequency components of the angle signal having a frequency greater than or equal to the cutoff frequency $f_c$, is output as the output signal Sout.

The centering signal generated in this manner and the position signal (Hall-X, Hall-Y) which is output by the ADC 10 are added, and the added signal is output to the servo circuit 14 so that it is possible to prevent, when the shake correction process is executed in the image capturing device, a disadvantage that the position of the lens is gradually deviated from the reference position as the correction process is continuously executed and reaches a point near the limit point of the movable range of the lens. In other words, by subtracting the output value from the centering processor circuit 200 from the angle signal, it is possible to control the lens such that the lens does not tend to move close to the limit point of the movable range of the lens.

In addition, when the image capturing device is set to fit the imaging target in the image capturing range or a video image of the imaging target is to be captured, the lens can always be moved to the center along with the shake correction so that the image capturing range is not exceeded by a significant vibration or the like of the image capturing device, and the correction range by the shake correction can be substantially maintained when the shutter is pressed at the time where the imaging target is fitted in the image capturing range, to capture a still image.

When the shutter is pressed in order to capture a still image with the image capturing device, the shutter signal SHOT is switched from the OFF state to the ON state. When the shutter signal SHOT is set to the ON state, latching is executed at the latch element 38, and the switch element 32 is opened so that the LPF 30 and the latch element 38 are disconnected from each other. With this process, a constant value Z3 is output from the latch element 38 until the image capturing of the still image is completed and the shutter signal SHOT is switched OFF. The adder 40 executes a process to subtract the constant value Z3 from the angle signal from the integrator circuit 22. In other words, in the centering processor circuit 200, the change of the angle signal from the integrator circuit 22 is directly reflected on the output value Sout, the centering process at the image stabilization circuit 100 is released, and the shake correction is strengthened.

The operation of the LPF 30 is continued even in the period when the shutter signal SHOT is in the ON state, and the value Z2 of the register included in the LPF 30 is continued to be updated.

When the image capturing of the still image is completed, the shutter signal SHOT is switched from the ON state to the OFF state. When the shutter signal SHOT is switched OFF, the latch of the latching element 38 is released, and the operations of the comparator 34 and the adder/subtractor 36 are started. The comparator 34 compares the value Z2 of the register included in the LPF 30 and the value Z3 of the latch element 38. When the value Z2 is determined to be greater than the value Z3 as a result of comparison, the addition instructing signal is output to the adder/subtractor 36 as the control signal C2, and when the value Z2 is determined to be less than the value Z3, the subtraction instructing signal is output to the adder/subtract 36 as the control signal C2. The adder/subtractor 36 adds the predetermined value α to the current value Z3 of the latch element 38 and outputs the resulting value to the latch element 38 when the control signal C2 is the addition instructing signal, and subtracts the predetermined value α from the current value Z3 of the latch element 38 and outputs the resulting value to the latch element 38 when the control signal C2 is the subtraction instructing signal. The latch element 38 outputs the value Z3 to the adder 40 while the value is being updated by the output value from the adder/subtractor 36. This process is continued until the control signal C1 is switched ON, that is, when the relationship in size between the value Z2 and the value Z3 is reversed. When the control signal C1 is set to the ON state, the switch element 32 is closed, and the operations of the comparator 34 and the adder/subtractor 36 are stopped. With this process, the device returns to the normal centering process.

With such a process, as shown with an arrow in the partial enlarged view of FIG. 2, when the latch of the latch element 38 is released, the value Z3 of the latch element 38 can be changed stepwise by the predetermined value α. Thus, it is possible to prevent rapid change of the output signal Sout from the centering processor circuit 200. In other words, the lens does not rapidly and significantly move when the image capturing of the still image is completed, and the occurrence of skipping of an image on the finder or the liquid crystal monitor can be inhibited. Moreover, it is possible to reduce the noise from the image capturing device and inhibit an uncomfortable feeling on the hand of the person performing the imaging.

Second Preferred Embodiment

Figure 3:
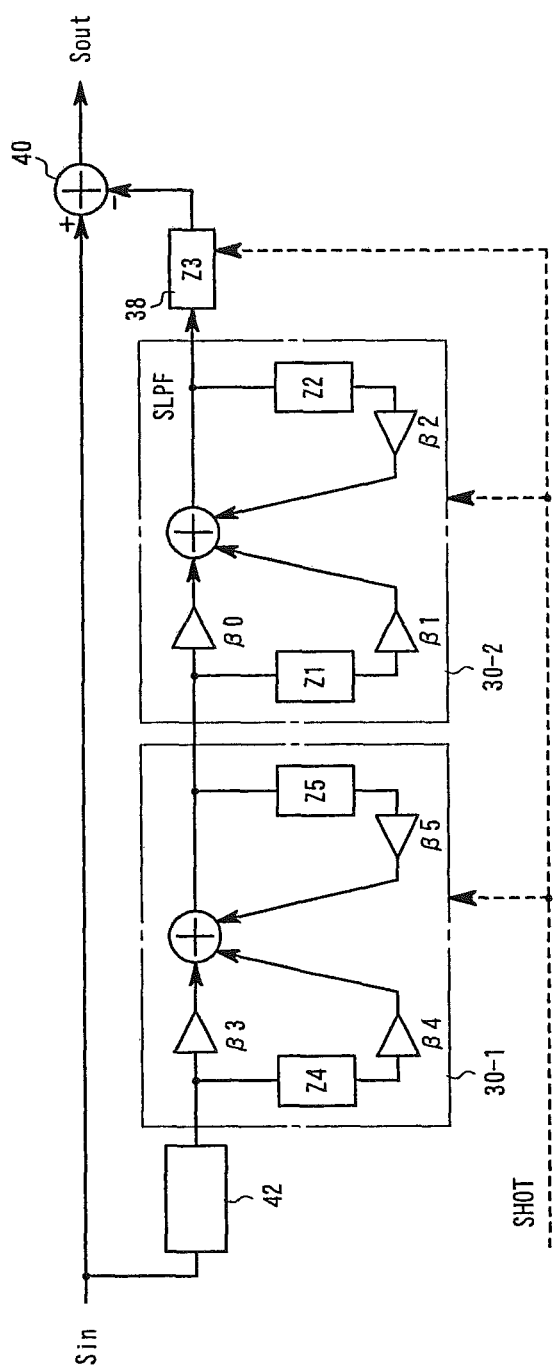
FIG. 3 is a diagram showing a structure of a centering processor circuit according to a second preferred embodiment of the present invention.

As shown in FIG. 3, a centering processor circuit 202 according to a second preferred embodiment of the present invention comprises low-pass filters (LPF) 30-1 and 30-2, the latch element 38, the adder 40, and a pre-stage filter 42.

The centering processor circuit 202 according to the present embodiment is used in place of the centering processor circuit 24 of the image stabilization circuit 100 shown in FIG. 5, and receives a signal from the integrator circuit 22 as the input signal and outputs a signal to the adder circuit 12. Because there is no change in the constituent elements in the image stabilization circuit 100 other than the centering processor circuit 202, in the following description, the centering processor circuit 202 will be described in detail.

The angle signal from the integrator circuit 22 is input to the centering processor circuit 202. The angle signal is input to the pre-stage filter 42 and the adder 40. The pre-stage filter 42 applies a process on the signal such as adjustment of the phase of the signal, and outputs the resulting signal to the LPF 30-1.

In the present embodiment, LPFs of two stages, LPF 30-1 and LPF 30-2, are provided. The LPFs 30-1 and 30-2 may be formed, for example, with a digital filter, an RC circuit, an RL circuit, an RLC circuit, or the like. In FIG. 3, each of the LPFs 30-1 and 30-2 is formed with a first-order IIR filter. In the LPF 30-1, a necessary frequency characteristic is obtained by changing coefficients β3, β4, and β5 with respect to the input signal, a register Z4, and a register Z5. Similarly, in the LPF 30-2, a necessary frequency characteristic is obtained by changing coefficients β0, β1, and β2 with respect to the input signal, a register Z1, and a register Z2.

By providing the LPFs 30-1 and 30-2 of two stages in this manner, it is possible to improve the filtering characteristic of the low-pass filter. Here, with the combination of LPFs 30-1 and 30-2 of two stages, a characteristic for outputting only the frequency components of frequencies less than or equal to the cutoff frequency $f_c$ of the input signal is achieved.

The LPFs 30-1 and 30-2 have such a structure that the LPFs 30-1 and 30-2 can be stopped or started according to the shutter signal SHOT. For example, a configuration is employed in which supply of a clock signal to the LPFs 30-1 and 30-2 can be stopped or started according to the shutter signal SHOT.

Similar to the first preferred embodiment, the latch element 38 updates the value Z3 with the output value of the LPF 30-2 when the shutter signal SHOT is in the OFF state, and outputs the updated value Z3 to the adder 40. When, on the other hand, the shutter signal SHOT is in the ON state, the latch element 38 latches the output value of the LPF 30-2 and outputs the value Z3 latched until the shutter signal SHOT is in the OFF state, to the adder 40.

The adder 40 subtracts the value Z3 which is input from the latch element 38 from the angle signal which is input from the integrator circuit 22, and outputs the resulting value.

Figure 4:
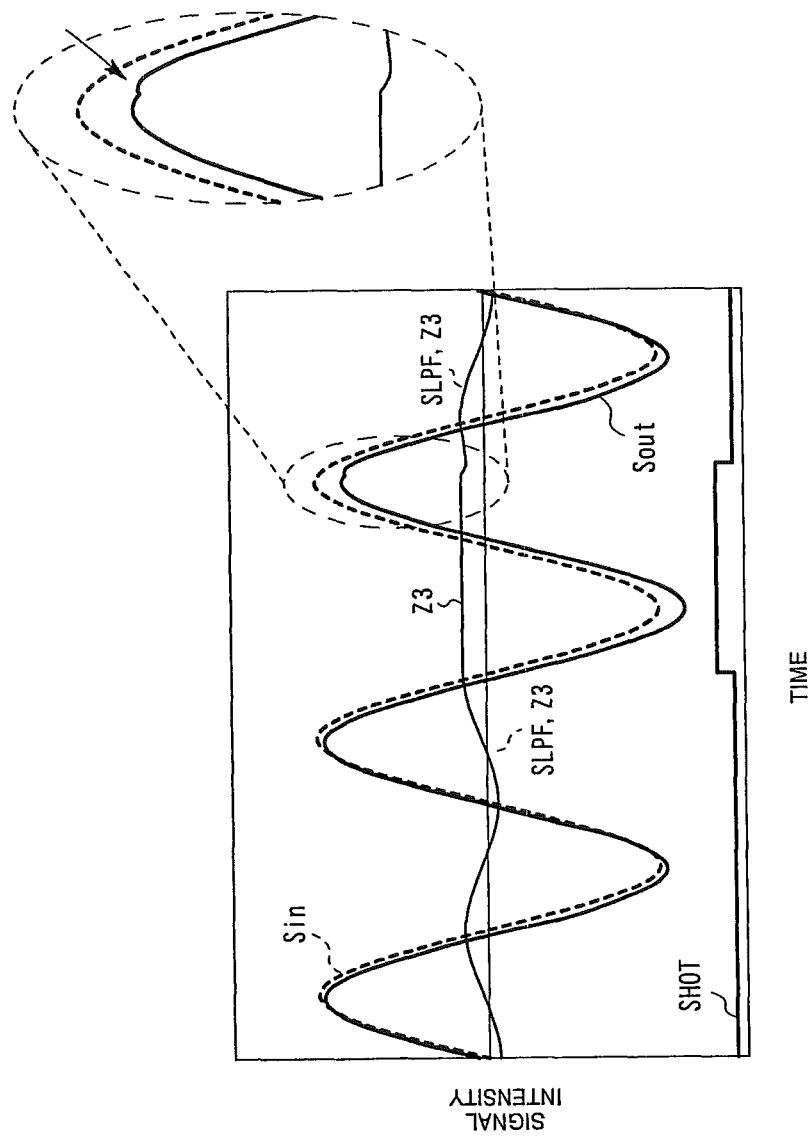
FIG. 4 is a diagram showing an operation of the centering processor circuit according to the second preferred embodiment of the present invention.

Next, an operation of the centering processor circuit 202 will be described with reference to FIG. 4. FIG. 4 shows change with respect to time of the input signal Sin to the centering processor circuit 202, the output value SLPF of the LPF 30-2, the output value Z3 of the latch element 38, the output signal Sout of the centering processor circuit 202, and the shutter signal SHOT. FIG. 4 also shows a partial enlarged view for clearly showing the operation of the centering processor circuit 202 in the present embodiment.

When the image capturing device is set so that the imaging target fits in the image capturing range or when the video image of the imaging target is to be captured, the shutter signal SHOT is in the OFF state, the LPFs 30-1 and 30-2 are in the operation state, and the latch element 38 outputs the value Z3 to the adder 40 while the value is updated by the output value from the LPF 30-2. The adder 40 executes a process to subtract the value Z3 which is output from the latch element 38, from the angle signal from the integrator circuit 22. With this process, in the centering processor circuit 202 as a whole, a signal in which the frequency components of the angle signal having a frequency of less than or equal to the cutoff frequency $f_c$ are removed from the angle signal, that is, a signal having frequency components of the angle signal of a frequency greater than or equal to the cutoff frequency $f_c$, is output as the output signal Sout. The centering signal generated in this manner and the position signal (Hall-X, Hall-Y) which is output by the ADC 10 are added, and the resulting signal is output to the servo circuit 14.

When the shutter is pressed in order to capture a still image with the image capturing device, the shutter signal SHOT is switched from the OFF state to the ON state. When the shutter signal SHOT is switched to the ON state, the latch element 38 executes latching, and the operations of the LPFs 30-1 and 30-2 are stopped. With this configuration, a constant value Z3 is output from the latch element 38 until the shutter signal SHOT is switched to the OFF state. The adder 40 executes a process to subtract the constant value Z3 from the angle signal from the integrator circuit 22. In other words, the change of the angle signal from the integrator circuit 22 is directly reflected in the output value Sout, the centering process at the image stabilization circuit 100 is released, and the shake correction is strengthened.

When the image capturing of the still image is completed, the shutter signal SHOT is changed from the ON state to the OFF state. When the shutter signal SHOT is switched to the OFF state, the latch at the latch element 38 is released, and the LPFs 30-1 and 30-2 are again started. With this process, the LPFs 30-1 and 30-2 are set to the operation state, and the latch element 38 outputs the value Z3 to the adder 40 while the value is updated by the output value from the LPF 30-2. In this case, however, because the LPFs 30-1 and 30-2 were in the non-operation state until the shutter signal SHOT is changed to the OFF state, the output signal of the LPF 30-2 gradually changes from the output value before the LPFs 30-1 and 30-2 are stopped to the output value according to the current input signal. The latch element 38 outputs the value Z3 to the adder 40 while the value is updated by the output value from the LPF 30-2.

In this manner, because the output value of the LPF 30-2 which becomes the input signal of the latch element 38 gradually changes when the latch of the latch element 38 is released, the output value Z3 of the latch element 38 is also gradually updated, as shown by an arrow in the partial enlarged view of FIG. 4. With this configuration, it is possible to prevent rapid change of the output signal Sout from the centering processor circuit 202. That is, rapid and significant movement of the lens when the image capturing of the still image is completed can be prevented and occurrence of skipping of an image on the finder or on the liquid crystal monitor can be inhibited. Moreover, noise from the image capturing device can be reduced and the uncomfortable feeling on the hand of the person performing image capturing can be inhibited.

In the present embodiment, a configuration is employed in which both the LPF 30-1 and the LPF 30-2 are stopped or started according to the shutter signal SHOT, but it is only necessary for the LPF 30-2 which is at the latest stage to be stopped. For example, when a one-stage low-pass filter is employed, the low-pass filter may be stopped or started according to the shutter signal SHOT. On the other hand, when three or more stages of low-pass filters are employed, at least one low-pass filter including the latest stage low-pass filter which is the closest to the latch element 38 may be stopped or started according to the shutter signal SHOT.

In the present embodiment, a configuration is employed in which the LPFs 30-1 and 30-2 are stopped during the entire period from the switching of the shutter signal SHOT to the ON state to the switching of the shutter signal SHOT to the OFF state, but alternatively, a configuration may be employed in which the LPFs 30-1 and 30-2 are stopped in only a part of the period. In this case also, the operation and advantage similar to the structure of the present embodiment can be obtained to a certain degree.

In the above description, a process such as the vibration compensation (shake prevention) or the like is realized by driving the lens, but the present invention is not limited to such a configuration. For example, an image capturing element (opto-electric conversion element such as CCD) or other optical system elements may be driven in place of the lens, and the relative position between the lens and the other optical system element may be changed. Moreover, the present invention is not limited to the vibration compensation control by feedback control using the position detecting element 102 and the servo circuit 14, and the present invention may be applied to vibration compensation control which does not use feedback control using a signal which is output by the vibration detecting element 106.

What is claimed is:

1. An image stabilization circuit, comprising:
a first high-pass filter which receives an input signal and which allows a frequency band of greater than or equal to a predetermined frequency to pass, wherein
the first high-pass filter comprises:
a first low-pass filter which allows a frequency component of the input signal less than or equal to a first frequency to pass;
a latch unit which latches an output value of the first low-pass filter according to a control signal; and
a calculating unit which outputs to the latch unit a difference between a predetermined value and an output of the latch unit and an output of the latch unit, and stepwise changes a held value of the latch unit to the output value of the first low-pass filter when latching by the latch unit is released.

2. The image stabilization circuit according to claim 1, wherein
the first high-pass filter further comprises:
a comparator which compares the output value of the first low-pass filter and the held value of the latch unit when the latching by the latch unit is released; and
an adder/subtractor which adds a predetermined value to the held value of the latch unit when the comparator determines that the output value of the first low-pass filter is greater than the held value of the latch unit, and subtracts a predetermined value from the held value of the latch unit when the comparator determines that the output value of the first low-pass filter is less than the held value of the latch unit, and
the held value of the latch unit is stepwise changed to the output value of the first low-pass filter.

3. The image stabilization circuit according to claim 1, wherein
the first high-pass filter stops an operation of the first low-pass filter for at least a part of a latch period at the latch unit, and stepwise changes the held value of the latch unit to the output value of the first low-pass filter by re-starting the first low-pass filter when the latching by the latch unit is released.

4. The image stabilization circuit according to claim 2, wherein the first low-pass filter comprises at least two stages of filter circuits.

5. The image stabilization circuit according to claim 1, further comprising:
 a second high-pass filter which allows only a frequency component of a signal from a gyro sensor more than or equal to a second frequency to pass; and
 an integrator circuit which integrates a signal from the second high-pass filter and outputs a resulting signal to the first low-pass filter.

6. The image stabilization circuit according to claim 1, further comprising:
 an integrator circuit which integrates a velocity signal which is output from a vibration detecting element, generates a signal which indicates an amount of movement, and which outputs the generated signal to the first high-pass filter; and
 a correction signal generator circuit which generates a correction signal which controls driving of an optical system element which is driven during a vibration compensation control, according to a signal which is output from the first high-pass filter.

7. An image capturing device which prevents shake of an imaging target as a result of vibration, the image capturing device comprising:
 an optical system element;
 a driving element which drives the optical system element;
 a vibration detecting element which detects vibration of the image capturing device; and
 an image stabilization circuit which generates a correction signal which controls the driving element, based on a signal which is output from the vibration detecting element, wherein
the image stabilization circuit comprises:
an integrator circuit which integrates a velocity signal which is output from the vibration detecting element and generates a signal which indicates an amount of movement;
a first high-pass filter which receives a signal which is output from the integrator circuit and which allows a frequency band of greater than or equal to a predetermined frequency to pass; and
a correction signal generator circuit which generates the correction signal according to a signal which is output from the first high-pass filter,
the first high-pass filter comprising:
a first low-pass filter which allows only a frequency component of a signal which is output from the integrator circuit less than or equal to a first frequency to pass;
a latch unit which latches an output value of the first low-pass filter according to a control signal; and
a calculating unit which outputs to the latch unit a difference between a predetermined value and an output of the latch unit, and stepwise changes a held value of the latch unit to the output value of the first low-pass filter when latching by the latch unit is released.

* * * * *